United States Patent
Podwys

[15] 3,666,317
[45] May 30, 1972

[54] SUPPORT MEMBERS FOR A CONVERTIBLE TOP

[72] Inventor: Stanley Podwys, Orchard Lake, Mich.
[73] Assignee: General Motors Corporation, Detroit, Mich.
[22] Filed: Nov. 27, 1970
[21] Appl. No.: 93,020

[52] U.S. Cl. .......................296/116, 296/121, 292/DIG. 5
[51] Int. Cl. ..............................................................B60j 7/18
[58] Field of Search..............296/107, 116, 117, 121, 137 A; 292/DIG. 5

[56] References Cited

UNITED STATES PATENTS

| | | | |
|---|---|---|---|
| 3,342,525 | 9/1967 | Griffin | 296/121 |
| 3,348,876 | 10/1967 | Pollak et al. | 296/121 |

*Primary Examiner*—Benjamin Hersh
*Assistant Examiner*—Winston H. Douglas
*Attorney*—W. E. Finken and Herbert Furman

[57] ABSTRACT

A pair of support members are respectively mounted on the forward ends of the front rail sections of an inwardly folding side rail type convertible top wherein the pivotal axes between the front and rear rail sections of each rail, between the convertible top header and the front rail section of each rail, and between a vehicle body mounted support panel and the rear rail section of each rail converge at respective points located short of infinity. When the top is in raised position, the support members extend forwardly from the front rail sections and are received between the convertible top header and the windshield header of the vehicle body. The support members are clamped between the headers by conventional convertible top latch mechanisms to support the pivotal connections between the front rail sections and the convertible top header thus rigidifying the rails.

2 Claims, 5 Drawing Figures

INVENTOR.
Stanley Podwys
BY
Herbert Furman
ATTORNEY

INVENTOR.
Stanley Podwys
BY
Herbert Furman
ATTORNEY

SUPPORT MEMBERS FOR A CONVERTIBLE TOP

My invention relates to a pair of support members for supporting the pivotal connections between the front rail sections and the convertible top header of an inwardly folding side rail type convertible top wherein the pivotal axes of each rail converge at respective points located short of infinity.

My U.S. Pat. No. 3,312,499, which is assigned to the assignee of my present invention, discloses an inwardly folding side rail type convertible top wherein the pivotal axes of each side rail converge at respective points located short of infinity. During movement of this type of convertible top between storage and raised positions, the movement of the convertible top header is controlled solely by the geometrical restraints provided by the converging axes of each side rail. However, there is a small amount of inherent play at the pivotal connections between the forward ends of the front rail sections and the convertible top header. This play necessarily results in undesirable sealing and noise problems when the top is in raised position with the convertible top header supported by the windshield header of the vehicle body.

My present invention eliminates these problems by providing a pair of support members that extend forwardly from the front rail sections and are secured to one of the headers to support the pivotal connections between the front rail sections and the convertible top header to thus rigidify the rails.

Accordingly, an object of this invention is to provide a pair of support members that support the pivotal connections between the front rail sections and the convertible top header of an inwardly folding side rail type convertible top wherein the pivotal axes of each side rail converge at respective points located short of infinity.

In carrying out this object, the support members of this invention are mounted on the forward ends of the front rail sections and with the top in raised position extend forwardly therefrom to be secured to one of the headers by latch mechanisms.

In the preferred embodiment, the support members are received between the convertible top header and the windshield header and the latch mechanisms which conventionally secure the headers to each other clamp the support members between the headers to provide the support for the pivotal connections between the convertible top header and the front rail sections.

Figure 1:
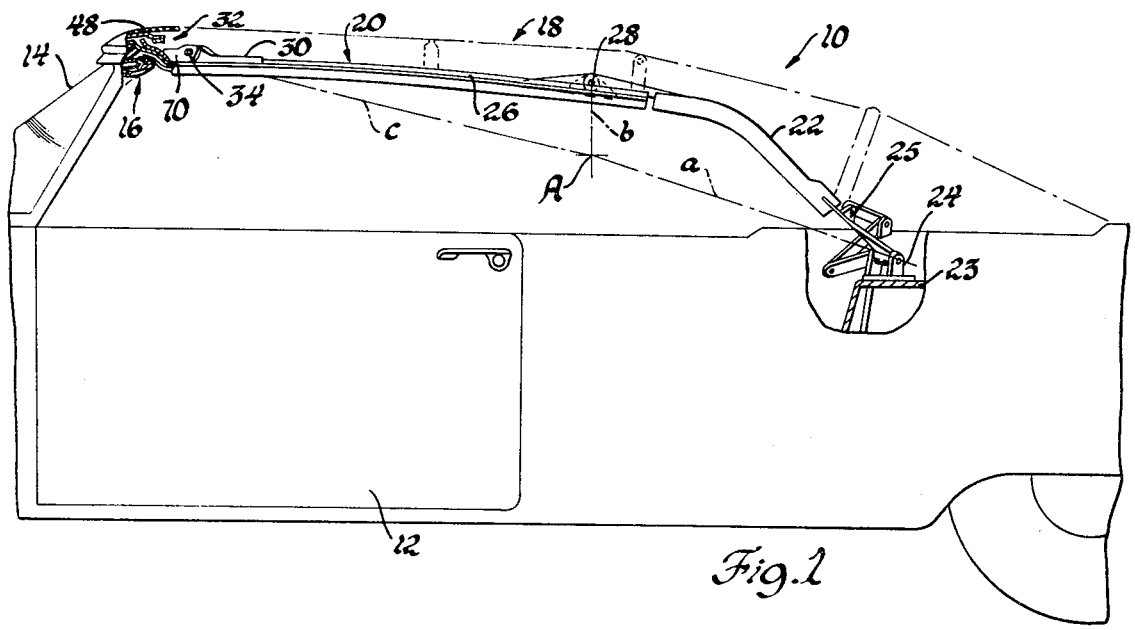
FIG. 1 is a partially broken away and partially sectioned view of a portion of a vehicle that includes a convertible top having a pair of support members according to the invention.

Referring now to the drawings, and more particularly to FIG. 1, a conventional convertible vehicle generally indicated at 10 includes a front door 12, a windshield 14, a windshield header 16, and a convertible top 18 having a pair of support members according to the invention, as will be described. The convertible top 18 includes left and right-hand inwardly folding side rails 20 respectively extending along the left and right-hand sides of vehicles 10 when the top is in the FIG. 1 raised position. The left-hand rail 20 will be more fully described with the understanding that the right-hand rail 20 is symmetrical to its left-hand counterpart and as such will not be further described. As seen in FIG. 1, the left-hand rail 20 includes a rear rail section 22 that is pivoted along an axis $a$ to a body support panel 23 by a clevis member 24. Adjacent its rearward end, rail section 22 includes an apertured lug 25 that allows attachment of an actuating mechanism for moving top 18 between the raised position and a storage position. An actuating mechanism of this type is shown and described in my previously mentioned U.S. Pat. No. 3,312,499 and, as such, will not be described here. Adjacent its forward end, the rear rail section 22 is pivoted to a front rail section 26 along an axis $b$ by a pin 28. The forward end of front rail section 26 supports an apertured support member 30 that is pivoted to a convertible top header 32 along an axis $c$ by a pin 34. Axes $a$, $b$ and $c$ converge at a point A as described in my previously mentioned U.S. Pat. No. 3,312,499.

Figure 2:
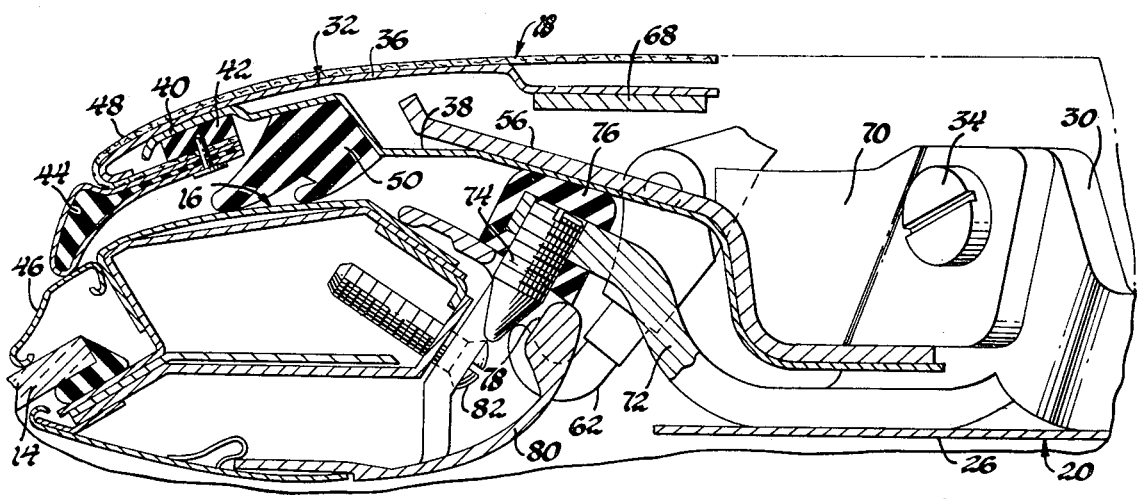
FIG. 2 is a sectional view taken along line 2—2 of FIG. 4.

Referring additionally now to FIG. 2, the convertible top header 32 includes an upper panel 36 and a lower panel 38 that are welded to each other adjacent their forward edges to form an attachment flange 40. Suitable clips, not shown, secure a conventional tacking strip 42 to flange 40. Attached to tacking strip 42 is a trim seal 44 that engages a reveal molding 46 when the top is in the raised position. Fabric 48 of top 18 is secured between tacking strip 42 and seal 44 and extends forwardly over the forward flanged edge of upper panel 36 and then rearwardly along the upper side of upper panel 36 when the top is in the raised position. Slightly to the rear of tacking strip 42, the lower panel 38 supports a seal 50 whose lips engage the upper side of windshield header 16 to cooperate with seal 44 in sealing the forward end of the passenger compartment of vehicle 10.

Figure 3:
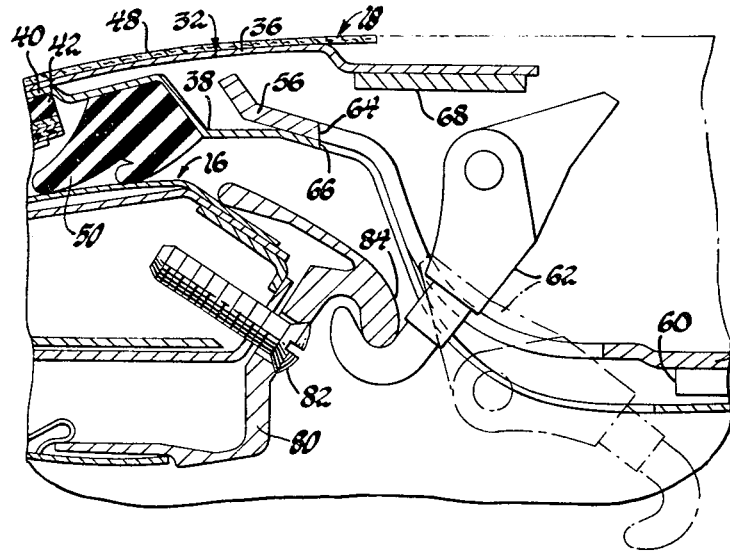
FIG. 3 is a sectional view taken along line 3—3 of FIG. 4 and showing the latch bolt in a solid line indicated latched position and a phantom line indicated unlatched position.
Figure 4:
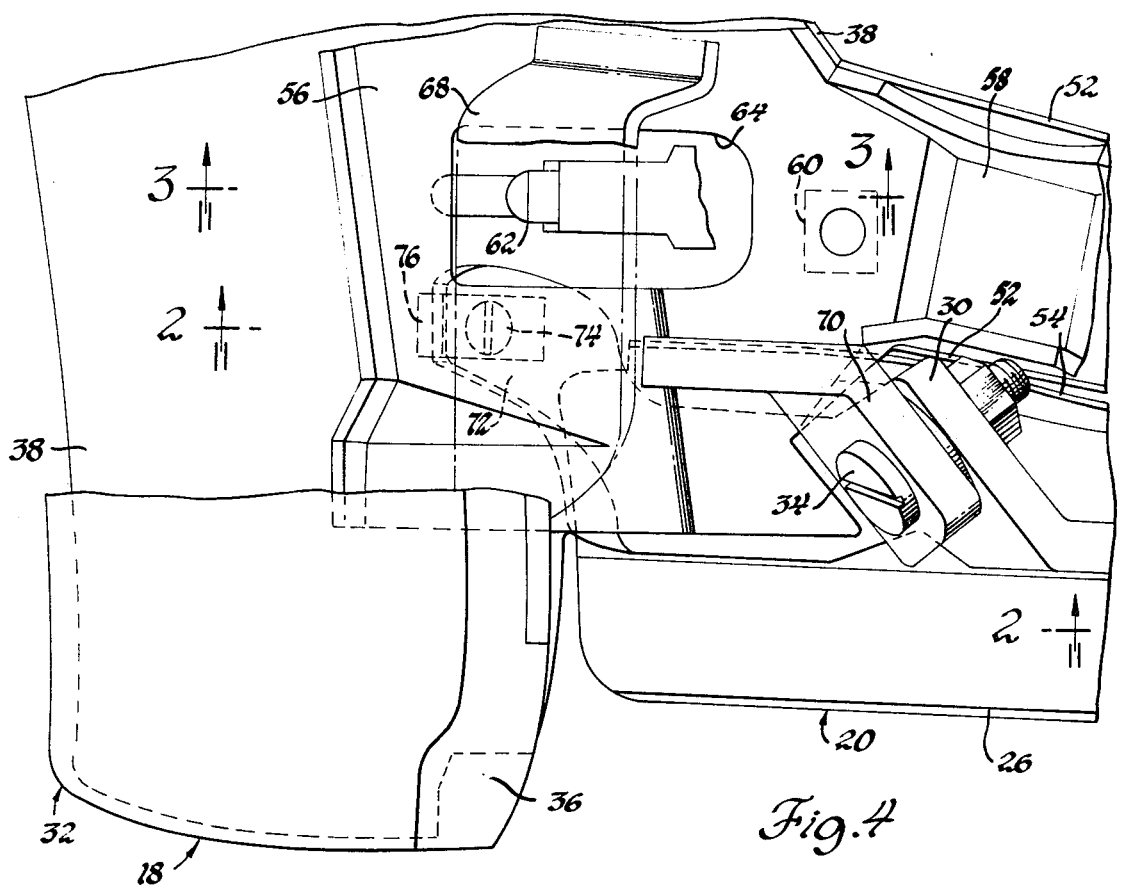
FIG. 4 is an enlarged partially broken away plan view of a portion of the top shown in FIG. 1.
Figure 5:
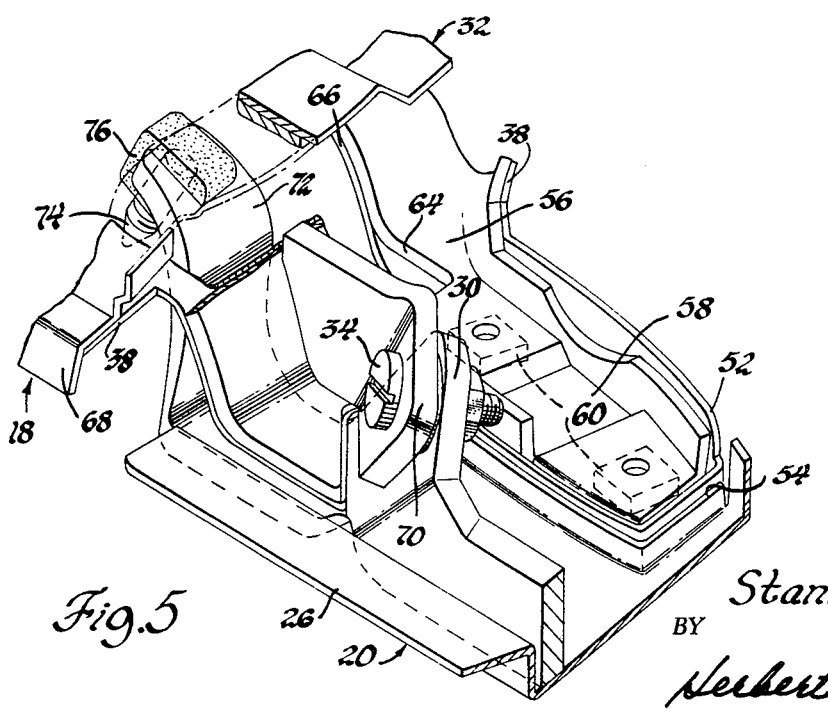
FIG. 5 is a reduced perspective view of the portion of the top shown in FIG. 4, however, further broken away.

As seen in FIGS. 4 and 5, when top 18 is in raised position, a flanged leg portion 52 of lower panel 38 extends rearwardly adjacent a generally L-shaped flange 54 of the front rail section 26. A somewhat pistol-shaped support panel generally indicated at 56 is welded to the upper side of lower panel 38 and includes a leg portion 58 that is received within the flanged leg portion 52 of lower panel 38. Suitable nuts 60 are welded to leg portion 58 and provide for attachment of conventional convertible top latch mechanisms to the convertible top header 32. U.S. Pat. to Heincelman No. 3,216,763, which is assigned to the assignee of this invention, discloses such a latch mechanism. As such, the operation of the latch mechanism will not be herein described except to say that a latch bolt generally indicated at 62, FIGS. 3 and 4, extends downwardly through apertures 64 and 66 in support panel 56 and lower panel 38, respectively, and moves between latched and unlatched positions as will be described. Intermediate its ends a generally laterally extending reinforcing panel 68 is welded to the lower side of upper panel 36 adjacent its rearward edge, as best seen in FIGS. 2 and 3. As best seen in FIGS. 4 and 5, the outboard and inboard ends of reinforcing panel 68 extend downwardly and are respectively welded to lower panel 38 and support panel 56 to rigidify the structure adjacent the apertures 64 and 66 of the panels. Adjacent the lateral outboard edge of apertures 64 and 66, an apertured member 70 cooperates with pin 34 and the apertured support member 30 to pivotally support the convertible top header 32 for movement about axis $c$.

As shown in FIGS. 2 and 5, a leg portion 72 of support member 30 mounts a guide pin 74 and a rubber bumper 76 having upper and lower legs. During movement of the top to the raised position, the guide pin 74 is received within an aperture 78 of an escutcheon 80 secured to the windshield header 16 by bolts 82. Substantially concomitant with the engagement of the lower leg of bumper 76 with escutcheon 80, the upper leg of bumper 76 engages the lower side of lower panel 38 of the convertible top header 32. Thereafter, a subsequent latching movement of the latch mechanism moves the latch bolt 62 from the FIG. 3 phantom line indicated unlatched position to the solid line indicated latched position in which the hooked end of bolt 62 engages a keeper portion 84 of escutcheon 80 and clamps the forward end of leg portion 72 between the windshield header 16 and the convertible top header 32. The leg portion 72 thus extends forwardly from the front rail section 26 and is clamped between the headers to support the pivotal connection between the convertible top header and the front rail section along axis $c$. As such, rail 20 is held against upward and downward deflection to thus prevent noise and sealing problems.

The invention thus provides a pair of support members that support the pivotal connections between the convertible top header and the front rail sections of an inwardly folding side rail type convertible top wherein the axes of each rail converge at respective points located short of infinity.

What is claimed is:

1. In combination with a convertible type vehicle body having a windshield header, a convertible top mounted on the body for movement between raised and lowered positions and including a pair of spaced foldable side rails interconnected by a top header latchable to the windshield header in the raised position with each side rail having a plurality of pivotally interconnected rail sections the respective pivotal axes of which converge at a point located short of infinity, the improvement comprising, a pair of support members respectively mounted on the front sections of the rails and extending forwardly therefrom when the top is in raised position, and latch means for securing the support members to one of the headers in the raised position of the top to support the pivotal connections between the top header and the front rail sections and rigidify the side rails against deflection at such pivotal connections.

2. In combination with a convertible type vehicle body having a windshield header, a convertible top mounted on the body for movement between raised and lowered positions and including a pair of spaced foldable side rails interconnected by a top header with each side rail including a plurality of pivotally interconnected rail sections the respective pivotal axes of which converge at a point located short of infinity, the improvement comprising, a pair of support members respectively mounted on the front sections of the rails and extending forwardly therefrom and received between the headers when the top is in raised position, and latch means for securing the headers to each other with the support members clamped therebetween to support the pivotal connections between the top header and the front rail sections and rigidify the side rails against deflection at such pivotal connections.

* * * * *